US008561555B2

(12) United States Patent
Yamada et al.

(10) Patent No.: US 8,561,555 B2
(45) Date of Patent: Oct. 22, 2013

(54) OXYFUEL COMBUSTION BOILER PLANT AND OPERATING METHOD FOR THE SAME

(75) Inventors: Akihiro Yamada, Tokai (JP); Tsuyoshi Shibata, Hitachiota (JP); Yoshiharu Hayashi, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 583 days.

(21) Appl. No.: 12/708,268

(22) Filed: Feb. 18, 2010

(65) Prior Publication Data

US 2010/0212555 A1    Aug. 26, 2010

(30) Foreign Application Priority Data

Feb. 25, 2009    (JP) ................. 2009-041637

(51) Int. Cl.
*F23J 15/00*    (2006.01)
*F23J 11/00*    (2006.01)
*F23B 30/00*    (2006.01)
*B01D 53/14*    (2006.01)
*C01B 31/20*    (2006.01)

(52) U.S. Cl.
USPC ........... 110/203; 110/234; 110/345; 423/220; 423/437.1

(58) Field of Classification Search
None
See application file for complete search history.

(56) References Cited

U.S. PATENT DOCUMENTS

| 7,516,620 | B2 * | 4/2009 | Patrick et al. ................... 60/653 |
| 8,091,369 | B2 * | 1/2012 | Allam et al. ..................... 60/772 |
| 2008/0286707 | A1 * | 11/2008 | Panesar et al. .................. 431/10 |
| 2009/0255450 | A1 * | 10/2009 | Stone et al. .................... 110/345 |
| 2009/0277363 | A1 * | 11/2009 | Shibata et al. ................. 110/186 |

FOREIGN PATENT DOCUMENTS

| JP | 2001-336736 A | 12/2001 |
| JP | 2008-537087 | 9/2008 |
| WO | WO 2006/094182 A2 | 9/2006 |

OTHER PUBLICATIONS

Japanese Office Action including English translation dated Feb. 2, 2011 (Nine (9) pages).
Corresponding European Search Report dated Apr. 18, 2011 (five(5) pages).

* cited by examiner

*Primary Examiner* — Melvin C Mayes
*Assistant Examiner* — Sheng H Davis
(74) *Attorney, Agent, or Firm* — Crowell & Moring LLP (57) ABSTRACT

An oxyfuel combustion boiler plant having a first boiler and a second boiler for injecting gas including oxygen in higher concentration than that in the air, gas including carbon dioxide in higher concentration than that in the air, and fuel from a burner and generating steam by combustion gas in a furnace, respectively, comprising:
an exhaust gas supply pipe for supplying exhaust gas discharged from the first boiler to a burner of the second boiler, and a gas flow rate control apparatus for controlling a flow rate of exhaust gas flowing through the exhaust gas supply pipe.

5 Claims, 6 Drawing Sheets

OXYFUEL COMBUSTION BOILER PLANT AND OPERATING METHOD FOR THE SAME

CLAIM OF PRIORITY

The present application claims priority from Japanese patent application serial No. 2009-041637, filed on Feb. 25, 2009, the content of which is hereby incorporated by reference into this application.

BACKGROUND OF THE INVENTION

1. Field of the Invention

The present invention relates to an oxyfuel combustion boiler plant and an operating method for the oxyfuel combustion boiler plant.

2. Description of Related Art

A thermal power plant including a boiler and a steam turbine as main components is pointed out that the discharge quantity of carbon dioxide that is a global warming factor is larger than those of other power generation systems.

Therefore, when burning fuel by a boiler, a method for burning fuel using high-purity oxygen instead of air is proposed. Hereinafter, a burning method using oxygen is called oxyfuel combustion and a burning method using air is called air combustion.

The oxyfuel combustion changes the greater part of exhaust gas to carbon dioxide. Therefore, when capturing carbon dioxide from exhaust gas, there is no need to concentrate carbon dioxide and the exhaust gas is directly cooled, thus the carbon dioxide can be liquefied and separated. Therefore, oxyfuel combustion is one of the methods effective in deletion of the carbon dioxide discharge quantity.

Further, the oxyfuel combustion, since nitrogen making up about 80% of the air is not supplied to the boiler, does not generate a nitrogen oxide (thermal NOx) generated from nitrogen in the air. Therefore, the reduction effect of nitrogen oxide can be expected.

However, the oxyfuel combustion boiler burns fuel using high-purity oxygen instead of air, so that the flame temperature rises extremely, thus there is a fear that the burner and boiler furnace wall surface may be damaged. Therefore, a system for circulating a part of the exhaust gas of the boiler and mixing and burning the oxygen and exhaust gas of the boiler is proposed.

Patent Document 1 describes a method for burning fuel using the air combustion system as usual at the start time and then shifting to the oxyfuel combustion system.

Patent Document 1: Japanese Patent Laid-open No. 2001-336736

SUMMARY OF THE INVENTION

When starting the boiler using the air combustion system, the carbon dioxide concentration in the exhaust gas is low, so it is difficult to remove carbon dioxide by the $CO_2$ capture facility used in the oxyfuel combustion. Therefore, after starting, until the boiler load reaches a predetermined value and the air combustion system is switched to the oxyfuel combustion system, exhaust gas containing carbon dioxide is discharged into the atmosphere directly from the chimney.

However, the main object of the oxyfuel combustion system is to remove carbon dioxide in the exhaust gas and greatly reduce the discharge quantity of global warming gas. Therefore, even in a low-load state, it is not desirable to discharge carbon dioxide into the atmosphere.

An object of the present invention is to reduce the discharge quantity of carbon dioxide when the oxyfuel combustion boiler is at a low load.

The present invention of an oxyfuel combustion boiler plant having a first boiler and a second boiler for injecting gas including oxygen in higher concentration than that in the air, gas including carbon dioxide in higher concentration than that in the air, and fuel from a burner and generating steam by combustion gas in a furnace, respectively, comprising: an exhaust gas supply pipe for supplying exhaust gas discharged from the first boiler to a burner of the second boiler, and a gas flow rate control apparatus for controlling a flow rate of exhaust gas flowing through the exhaust gas supply pipe.

According to the present invention, the discharge quantity of carbon dioxide when the oxyfuel combustion boiler is at a low load can be reduced.

DETAILED DESCRIPTION OF THE PREFERRED EMBODIMENTS

Hereinafter, the embodiments of the present invention will be explained with reference to the accompanying drawings.

Embodiment 1

Figure 1:
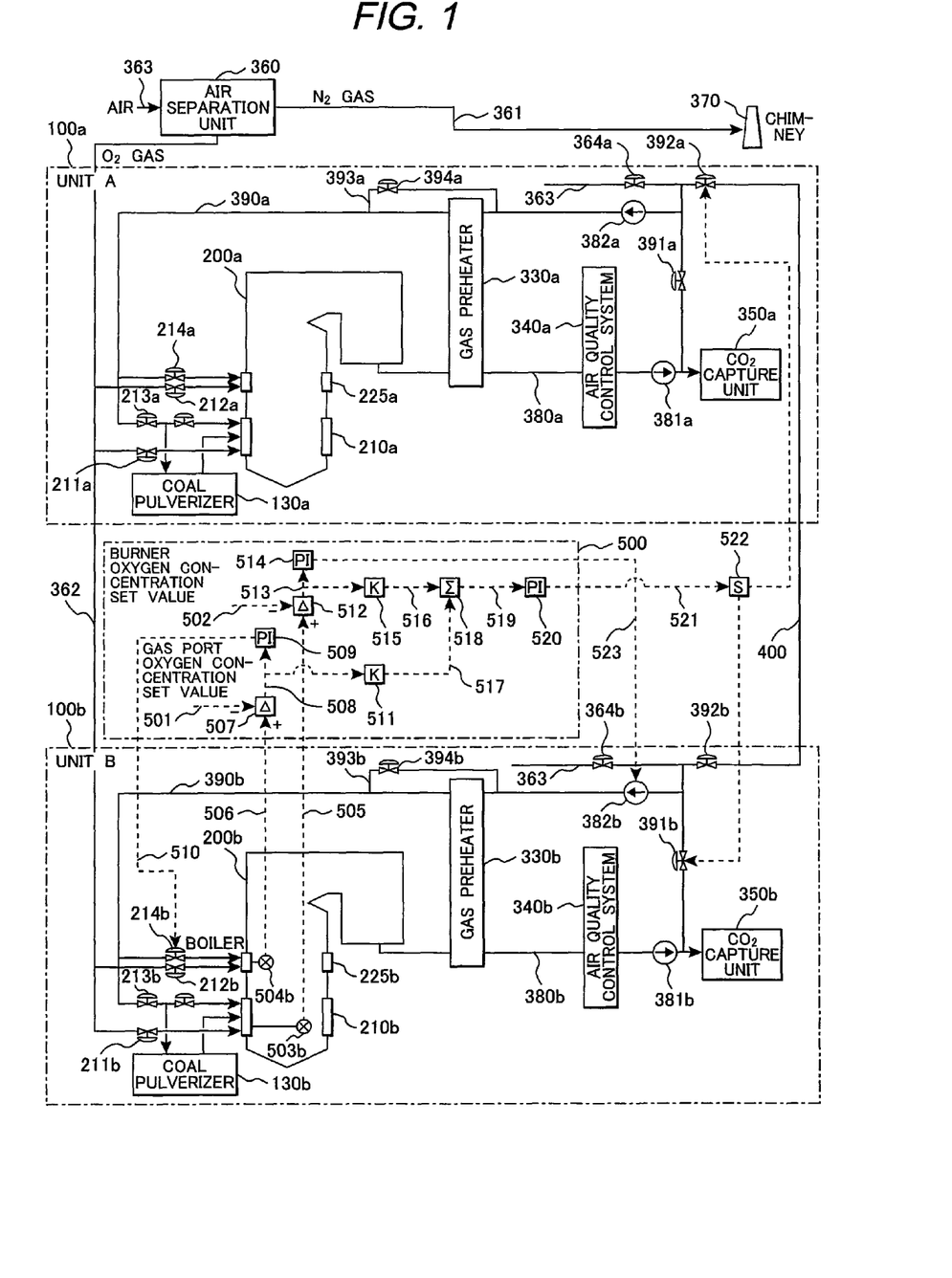
FIG. 1 is a drawing for showing the constitution of the boiler plant relating to an Embodiment 1 of the present invention.

FIG. 1 shows the constitution of the boiler plant using coal as fuel.

In FIG. 1, this embodiment of the boiler plant in the present invention shows the case that there are two plants with the same structure (hereinafter referred to as units). With respect to the numbers shown in the drawing, a is used for the unit A and b is used for the unit B.

This embodiment shows a thermal power plant for generating steam using a boiler 200. The system of a combustion exhaust gas 380 discharged from the boiler 200 includes a gas preheater 330, an air quality control system (AQCS) 340 for purifying exhaust gas, a fan 381 for permitting gas to flow, a $CO_2$ capture unit 350 for cooling, liquefying, and capturing carbon dioxide in the exhaust gas, and a chimney 370 for discharging gas mainly including nitrogen and oxygen remaining after the capture of carbon dioxide (the pipe from the $CO_2$ capture unit 350 to the chimney 370 is not drawn).

This embodiment aims at a boiler of the oxyfuel combustion system for burning fuel using gas including high-purity oxygen instead of air and a plant including the boiler of the oxyfuel combustion system.

Therefore, the oxyfuel combustion boiler includes an air separation unit (ASU) 360 for separating air into nitrogen gas and oxygen gas, thereby producing high-purity oxygen. The air separation unit 360 is a system for cooling air and separating oxygen and nitrogen using a difference in the boiling point between the two. This embodiment does not depend on the air separation method. The air separation method may be a membrane separation system for separating nitrogen and oxygen using a difference in the size between nitrogen molecules and oxygen molecules or others.

The air separation unit 360 separates air into high-purity oxygen gas 362 and nitrogen gas 361. The nitrogen gas 361 is discharged into the atmosphere from the chimney 370.

If fuel is burned using high-purity oxygen instead of air, the flame temperature rises extremely high, and there is the possibility that the burner and the wall surface of the boiler may be damaged. Therefore, the high-purity oxygen gas 362 produced by the air separation unit 360 is mixed with circulation exhaust gas 390 which is a part of the exhaust gas discharged from the boiler 200 and is supplied to a burner 210 and a gas port 225 for double combustion.

Combustion exhaust gas 380 is purified by the air quality control system 340, is partially taken out, and then is switched to the circulation exhaust gas 390. The temperature of the circulation exhaust gas 390 is raised by the gas preheater 330. A regulating valve 391 for the circulation exhaust gas flow rate regulates the flow rate of the circulation exhaust gas 390 by changing the aperture thereof.

Oxygen flow rate regulating valves 211 and 212 can regulate the flow rate of the oxygen gas 362 supplied to the burner 210 and the gas port 225 by regulating the aperture thereof. Further, exhaust gas flow rate regulating vales 213 and 214 can regulate the flow rate of the circulation exhaust gas 390 by controlling the aperture thereof.

On the other hand, coal which is fuel is changed to pulverized coal by a coal pulverizer 130 and is supplied to the burner 210 together with a part of the circulation exhaust gas 390 passing through the exhaust gas flow rate regulating valve 213. The burner 210 mixes and burns the oxygen gas 362 with the pulverized coal and the circulation exhaust gas 390, thereby generating high-temperature combustion gas in the furnace of the boiler 200.

The oxyfuel combustion system does not supply nitrogen making up about 80% of the air to the boiler, so that a nitrogen oxide (thermal NOx) mainly derived from nitrogen in the air is not generated and the discharge quantity of a nitrogen oxide is reduced compared with the air combustion system. Further, most of the carbon in the fuel is changed to carbon dioxide due to combustion. Therefore, the exhaust gas is changed to a high-concentration carbon dioxide gas.

Therefore, the oxyfuel combustion system, compared with the case that carbon dioxide is captured from the exhaust gas of the boiler of the air combustion system, does not require a step for concentrating carbon dioxide. The oxyfuel combustion system does not require the energy for concentrating carbon dioxide, thereby realizes a higher efficiency than that of the air combustion system, and becomes a system suited to the capture of carbon dioxide.

Figure 2:
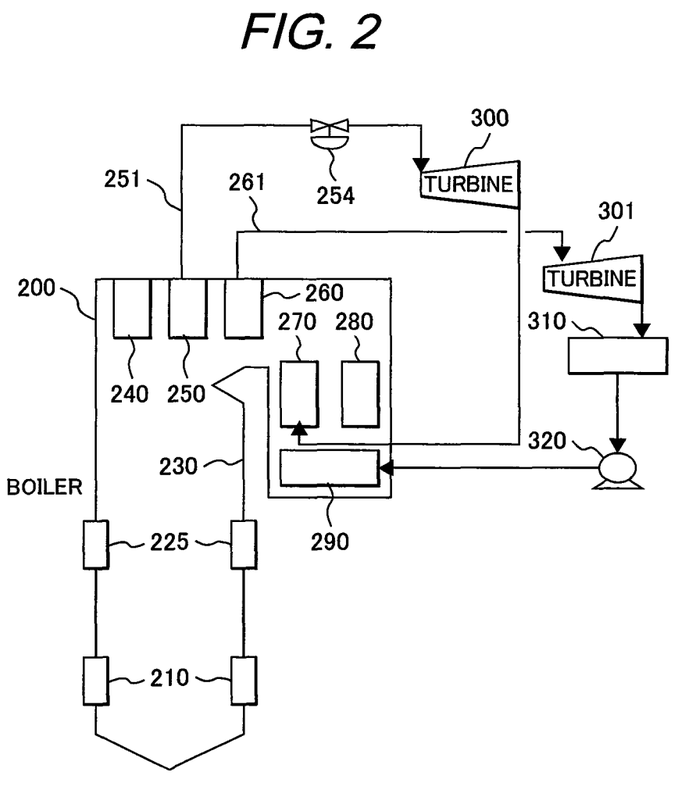
FIG. 2 is a drawing for showing the constitution and arrangement of the water-steam supply system of the Embodiment 1.

FIG. 2 shows the arrangement of the units of the water-steam supply system. The boiler 200 captures heat from the high-temperature combustion gas and generates steam. The furnace has a burner 210 for burning fuel, so that it becomes internally high in temperature. The cooling wall called a water wall 230 cools the wall surface overall and also captures the heat of the combustion gas. In the boiler 200, there is additionally a heat exchanger composed of an economizer 290, a primary superheater 280, a secondary superheater 240, a tertiary superheater 250, a primary reheater 270, and a secondary reheater 260. These heat exchangers capture the heat of the combustion gas and generate high-temperature steam.

Figure 3:
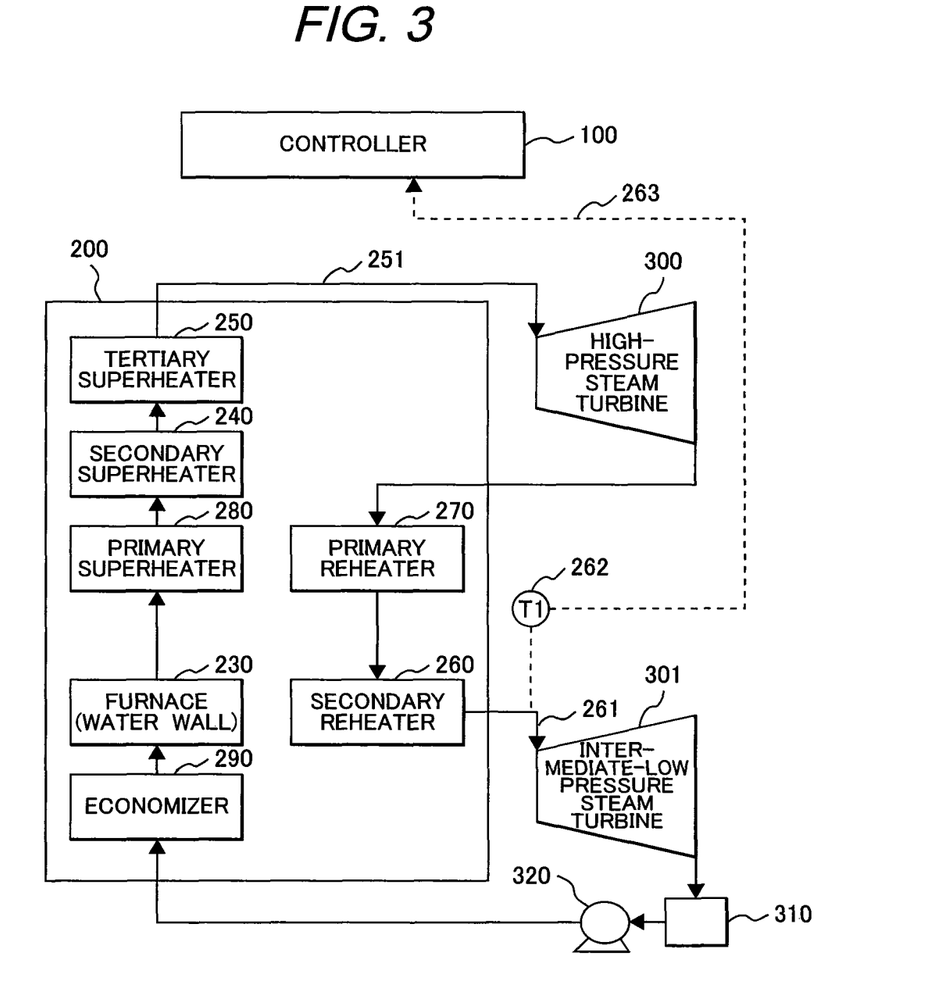
FIG. 3 is a drawing for showing the connection relation of the water-steam supply system of the Embodiment 1.

FIG. 3 shows the flow of steam. Feed water to the boiler 200 is firstly led to the economizer 290, then sequentially passes through the water wall 230, primary superheater 280, secondary superheater 240, and tertiary superheater 250, rises in temperature, becomes main steam 251, and enters a high-pressure steam turbine 300. The steam does its work in the high-pressure steam turbine 300, lowers in temperature and pressure, is reheated by the primary reheater 270 and secondary reheater 260, and enters an intermediate-low pressure steam turbine 301. Then, the steam is discharged from the intermediate-low pressure steam turbine 301, is cooled to liquid water by the condenser 310, and is sent again by the feed water pump 320 to the economizer 290 of the boiler 200 as feed water. The steam flows in the aforementioned cycle. Actually, there is a unit provided at the preceding stage of the economizer 290 such as feed water heater for raising the temperature of the feed water. However, it is not related directly to this embodiment, so the explanation thereof will be omitted.

The unit A of this embodiment is started firstly. The unit A cannot obtain the power (electric power) for driving the air separation unit 360 at the start time, so oxygen cannot be supplied to the boiler of the unit A and the circulation exhaust gas quantity cannot be stably ensured. Therefore, a method for starting the boiler of the oxyfuel combustion system by the air combustion system is proposed. When starting the boiler by the air combustion system, a regulating valve 391a for the circulation exhaust gas flow rate is closed, and an air flow rate regulating valve 364a is opened, thus air 363 is supplied to the boiler 200a instead of the exhaust gas, and combustion using air can be executed.

Incidentally, the recent progress of global warming is serious and the reduction in the discharge quantity of green house gas represented by carbon dioxide is strongly required. A thermal power plant for producing steam by heat obtained by burning fuel and generating power is pointed out that the discharge quantity of carbon dioxide is larger compared with the other power generation systems. On the other hand, the world power demand shows a continuously increasing tendency. Therefore, from the viewpoint of stable power supply, thermal power generation plays an important role as a power source facility. Therefore, the oxyfuel combustion system can easily capture carbon dioxide in exhaust gas, so it is an expectantly effective method for reducing the carbon dioxide output of thermal power plants.

However, if the second unit B is started by the air combustion system, at the time of the low load from start to switching to the oxyfuel combustion system, the carbon dioxide concentration in the exhaust gas is about 20% which is similar to that of the air combustion boiler. When only about 20% of carbon dioxide is contained in the exhaust gas, a step for concentrating carbon dioxide is necessary and the concentration step consumes energy. Therefore, the entire efficiency of the boiler plant is reduced. Therefore, while the boiler is operated by the air combustion system, it is difficult to separate and remove carbon dioxide.

Therefore, this embodiment of the present invention proposes an oxyfuel combustion boiler system capable of removing carbon dioxide in the exhaust gas with the plant efficiency kept even in the low-load state from start to switching to the oxyfuel combustion system and reducing the quantity of carbon dioxide discharged into the atmosphere. Namely, from the start time of the second unit, the boiler plant can be operated by the oxyfuel combustion system, thus the carbon dioxide discharge quantity at the initial stage of operation can be greatly suppressed.

The constitution shown in FIG. 1 shows a power plant composed of two units of a unit A 100a and a unit B 100b. The case that the unit A 100a is started first and then the unit B 100b is started will be considered. At the start time of the unit A 100a, there is no generated energy in the plant, so the air separation unit 360 cannot supply oxygen gas to a boiler 200a. Further, there is no circulation exhaust gas. Therefore, the unit A 100a started firstly must be started by the aforementioned air combustion system.

However, the second unit B 100b is started by the oxyfuel combustion system, so that the carbon oxide quantity discharged from the unit B 100b can be reduced. The specific method for starting the unit B 100b will be explained below.

Figure 6:
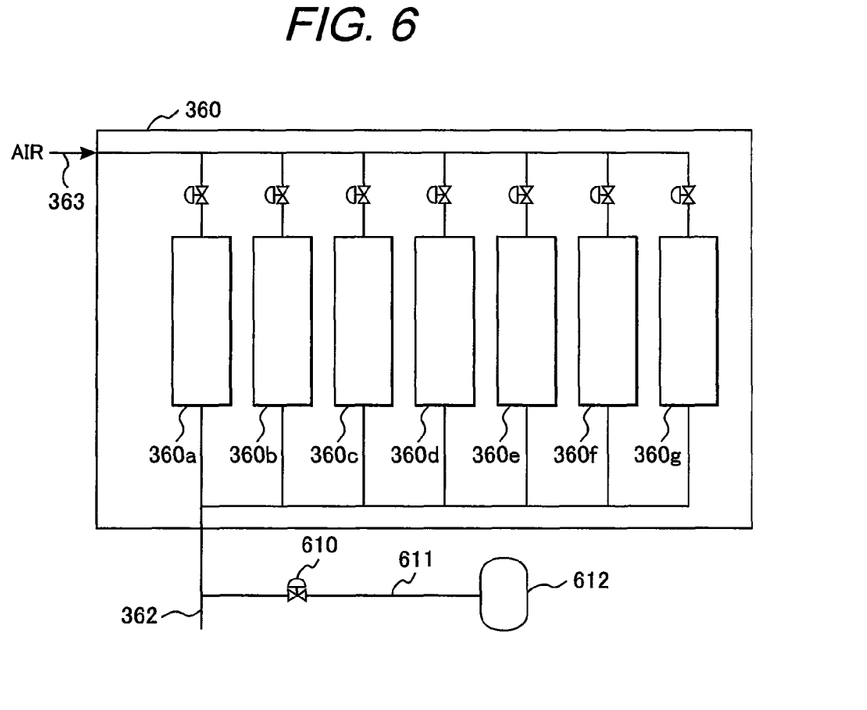
FIG. 6 is a drawing for showing a constitution example of the air separation unit (ASU) of the Embodiment.

Firstly, the supply method of the oxygen gas 362 will be described. As shown in FIG. 6, the air separation unit 360 is composed of units 360a to 360g having a small capacity with seven units in total. In this embodiment, to respond to the maximum load of one unit, three units must be operated. When starting the unit B 100b while the unit A is operating at the maximum load, the oxygen gas necessary to start the unit B 100b sequentially operates the necessary number of units among the remaining four units. Further, to produce oxygen, the air separation unit 360 requires electric power. Therefore, the air separation unit 360 uses the generated output of the unit A 100a.

The electric power for operating the air separation unit 360 may be considered to be received by a method for receiving from the electric power system. However, the power consumption of the air separation unit is comparatively large, so a power receiving facility with a large capacity is necessary. Therefore, it is desirable to use the generated output of the unit A.

Next, the supply method of circulation exhaust gas 390b will be described. The exhaust gas circulation systems of the unit A 100a and unit B 100b are connected with an exhaust gas supply pipe 400. When the unit B 100b is started, the air flow rate regulating valves 364a and 364b are in the fully-closed state and the atmosphere is not supplied to a boiler 200b. The circulation exhaust gas flow rate regulating valve 391a and exhaust gas supply quantity regulating valves 392a and 392b are opened, and a part of the circulation exhaust gas of the unit A 100a passes through the exhaust gas supply quantity regulating valve 392a and is supplied to the unit B 100b by the exhaust gas supply pipe 400. The exhaust gas supply quantity regulating valve 392b is fully opened and exhaust gas supplied from the unit A 100a is sent to the boiler 200b by a fan 382b. Further, the total exhaust gas quantity discharged by the boiler 200a of the unit A is the total of the exhaust gas quantity necessary for the load demand of the unit A (that is, the exhaust gas quantity recirculated to a burner 210a of the unit A) and the exhaust gas quantity necessary at the start time of the unit B.

At this time, a regulating valve 391b for the circulation exhaust gas flow rate is fully closed, and gas discharged from the boiler 200b passes through an air quality control system 340b and the whole amount is sent to a $CO_2$ capture unit 350b by a fan 381b, and then carbon dioxide is separated and removed. When starting the unit B 100b, for the power of the $CO_2$ capture unit 350, the generated output of the unit A is used.

Figure 7:
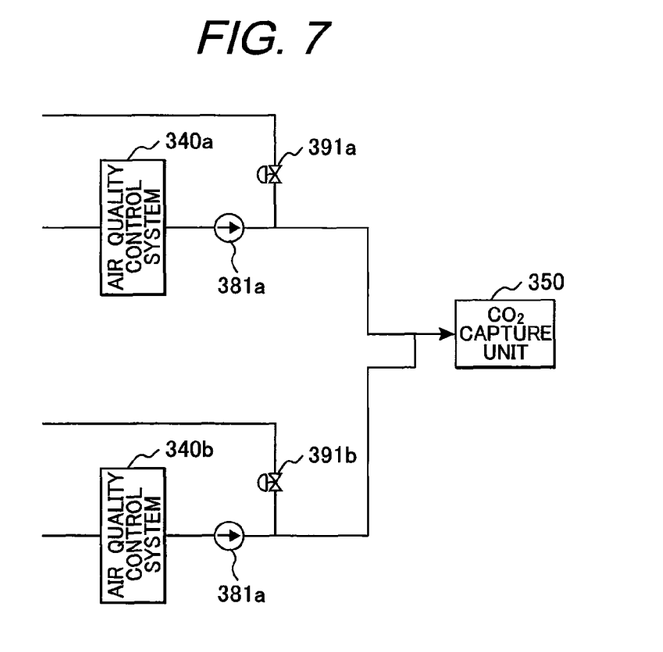
FIG. 7 is a drawing for explaining a connection example of the exhaust gas pipe to the $CO_2$ separation unit of the Embodiment.

In FIG. 1, the $CO_2$ capture unit 350 is installed on each unit. However, as shown in FIG. 7, the $CO_2$ capture unit 350 can be shared between the units.

Next, the control method of the exhaust gas supply quantity will be explained. FIG. 1 shows a gas flow rate control apparatus 500 for controlling the exhaust gas flow rate supplied to the unit B 100b. The oxygen concentration of a fluid injected from the burner 210b and the gas port 225b is controlled according to the target value preset depending on the load condition of the boiler.

The oxygen quantity supplied to the burner 210b is preset from the combustion characteristics thereof according to the fuel quantity. The oxygen quantity supplied to the gas port 225b is preset on the basis of the double combustion characteristics according to the load condition of the boiler. The apertures of a burner oxygen regulating valve 211b and a gas port oxygen regulating valve 212b are controlled respectively so as to supply the preset oxygen quantities.

If the supply oxygen quantities to the burner 210b and the gas port 225b are decided, the exhaust gas quantities supplied to them are controlled, thus the oxygen concentration of each unit is controlled to a preset target value of the oxygen concentration.

The entrance oxygen concentrations of the burner 210b and gas port 225b are measured respectively by oxygen densitometers 503b and 504b. A measured oxygen concentration 505 of the burner is transmitted to a subtracter 512 and the subtracter 512 outputs a deviation signal 513 between the burner oxygen concentration 505 and a burner oxygen concentration set value 502. The deviation signal 513 of the burner oxygen concentration is input to a proportional integration controller 514 and the proportional integration controller 514 outputs a control instruction 523 for controlling the number of revolutions of the fan 382b so as to reduce the deviation signal 513 to zero. The fan 382b changes the number of revolutions on the basis of the control instruction 523, thereby the supply exhaust gas quantity can be controlled. On the other hand, a gas port oxygen concentration 506 is transmitted to a subtracter 507 and the subtracter 507 outputs a deviation signal 508 between the gas port oxygen concentration 506 and a gas port oxygen concentration set value 501. The deviation signal 508 is input to a proportional integration controller 509 and the proportional integration controller 509 outputs a control instruction 510 for controlling the aperture of a flow rate regulating valve 214b so as to reduce the deviation signal 508 of the gas port oxygen concentration to zero. The flow rate regulating valve 214b changes the aperture on the basis of the control instruction 510, thereby the exhaust gas quantity supplied to the gas port can be controlled.

Further, the deviation signals 513 and 508 are changed to signals 516 and 517 that are multiplied by predetermined gains of gain multipliers 515 and 511. The signals 516 and 517 are input to an adder 518 and the adder 518 outputs a signal 519 to a proportional integration controller 520. The proportional integration controller 520 outputs a control instruction 521 to a switching unit 522 and the switching unit 522 controls the aperture of the exhaust gas supply quantity regulating valve 392a of the unit A 100a.

The aperture of the exhaust gas supply quantity regulating valve 392a is changed on the basis of the control instruction 521 and can control the exhaust gas quantity supplied from the unit A 100a to the unit B 100b. As mentioned above, the boiler includes the exhaust gas supply pipe 400 for supplying exhaust gas discharged from the unit A to the burner of the unit B and the gas flow rate control apparatus 500 for controlling the exhaust gas flow rate flowing through the exhaust gas supply pipe, thus from the start time of the unit B, exhaust gas of the unit A can be supplied to the burner 210b and gas port 225b of the unit B. Therefore, the unit B can be started by the oxyfuel combustion system and from the start time, can keep the carbon dioxide concentration in the exhaust gas high. Therefore, the unit B starting secondarily does not need to concentrate carbon dioxide in the exhaust gas, thus carbon dioxide can be separated and captured easily, so that the discharge quantity of carbon dioxide at the time of low loads of the oxyfuel combustion boiler can be suppressed. The discharge quantity of carbon dioxide when the oxyfuel combustion boiler is started can be reduced more, resulting in a contribution to the suppression of global warming.

From the start of the unit B 100b to a predetermined load condition, the switching unit 522 outputs the control instruction 521 to the exhaust gas supply quantity regulating valve 392a and after arrival at the predetermined load condition, switches so as to output the control instruction 521 to the circulation exhaust gas flow rate regulating valve 391b. Further, the predetermined load condition may be considered to be the point of time when the exhaust gas quantity discharged from the unit B is stabilized.

From the start time to the predetermined load condition, the circulation exhaust gas flow rate regulating valve 391b is fully closed. When switching the output by the switching unit 522, if the exhaust gas supply quantity regulating valve 392a is closed by opening the circulation exhaust gas flow rate regulating valve 391b, the gas quantity passing through the fan 382b is kept constant. After switching, the exhaust gas supply quantity regulating valves 392a and 392b are fully closed and exhaust gas does not flow from the unit A 100a to the unit B 100b.

As mentioned above, on the basis of the exhaust gas flow rate calculated by the gas flow rate control apparatus 500, the switching unit 522 for controlling the exhaust gas flow rates flowing through the exhaust gas supply pipe 400 for supplying exhaust gas from the unit A to the unit B and the exhaust gas circulation system for recirculating exhaust gas discharged from the boiler 200b of the unit B to the boiler 200b of the unit B is installed, thus after the load rate of the unit B reaches the predetermined load condition, exhaust gas does not flow from the unit A to the unit B. Therefore, the unit A and unit B can be operated independently of each other, thus the control can be executed easily.

Further, the switching unit 522, after arrival at the predetermined load condition of the boiler, reduces the exhaust gas quantity of the exhaust gas supply pipe 400 and increases the circulation exhaust gas quantity of the unit B, thus the exhaust gas flow rate flowing through the boiler 200b of the unit B can be kept constant.

The aforementioned control method is explained for the unit B 100b, though the oxygen concentration control method of the burner 210 and gas port 225 is the same for the unit A 100a. Further, even if the unit B 100b is started initially and then the unit A 100a is started, the units are only interchanged and the control method is kept unchanged.

In this embodiment, an exhaust gas bypass pipe 393 bypassing the gas preheater 330 is installed. The flow rate of the exhaust gas bypass pipe 393 can be controlled by a bypass exhaust gas flow rate regulating valve 394. By doing this, the temperature of exhaust gas supplied to the burner 210 and gas port 225 can be controlled.

In FIG. 1, the exhaust gas supply pipe 400 between the units is connected on the front side of the fan 382a. However, the exhaust gas supply pipe 400 may be connected on the downstream side of an exhaust gas bypass pipe 393a so as to supply exhaust gas heated by a gas preheater 330a of the unit A 100a to the unit B 100b.

Further, in this embodiment, in the system for returning exhaust gas discharged from an air quality control system 340a of the unit A to the gas preheater 330a, an entrance to the exhaust gas supply pipe 400 is installed. The air quality control system 340a removes NOx and SOx that are harmful components from the exhaust gas. The exhaust gas with the harmful components removed is permitted to flow through the exhaust gas supply pipe 400, thus the exhaust gas supply pipe 400 can be prevented from corroding.

Also, the gas flow rate control apparatus 500 may have a function for calculating the total exhaust gas quantity obtained by adding the exhaust gas quantity necessary for the operation condition of the boiler 200b of the unit B to the exhaust gas quantity necessary for the load demand of the boiler 200a of the unit A and controlling the exhaust gas flow rate flowing into the boiler 200b of the unit B on the basis of the total exhaust gas quantity.

Figure 5:
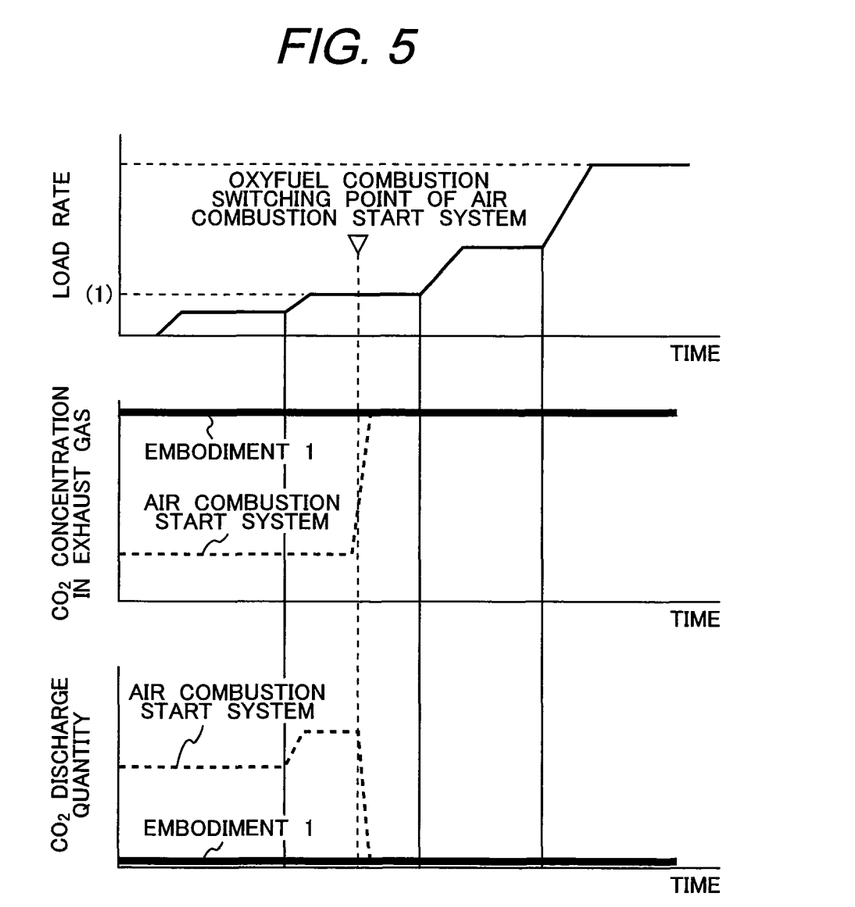
FIG. 5 is a drawing for explaining the reduction effect of the discharge quantity of carbon dioxide in the Embodiment 1 of the present invention.

FIG. 5 is a drawing showing changes in the carbon dioxide concentration and carbon dioxide discharge quantity included in the exhaust gas after the unit B 100b is started. Firstly, as a comparison example, the behavior of the air combustion start system will be explained. The air combustion start system operates by the air combustion system as far as the load rate (1), increases the circulation exhaust gas quantity by reducing the air quantity at the load rate (1), simultaneously starts oxygen supply, and moves to the oxyfuel combustion system.

During operation by the air combustion system as far as the load rate (1), the carbon dioxide concentration in the exhaust gas is about 20% and most of the remainder is nitrogen gas contained in the air. In this period, the carbon dioxide concentration in the exhaust gas is low and carbon dioxide can be hardly separated and removed, so the exhaust gas is discharged straight into the atmosphere.

At the point of time when the air combustion system is switched to the oxyfuel combustion system at the load rate (1), nitrogen in the air is not input into the boiler, so the carbon dioxide concentration in the exhaust gas is increased to 80% or more. Therefore, the step of concentrating carbon dioxide in the exhaust gas can be omitted and the $CO_2$ capture unit 350 can separate and easily remove carbon dioxide. Therefore, carbon dioxide in the exhaust gas is almost completely removed and carbon dioxide discharged into the atmosphere is extremely reduced.

On the other hand, in this embodiment, the boiler can be operated by the oxyfuel combustion system from the start time, so that the carbon dioxide concentration in the exhaust gas is high from the beginning. Therefore, the carbon dioxide quantity discharged into the atmosphere before arrival at the load rate (1) can be almost completely eliminated.

Embodiment 2

Figure 4:
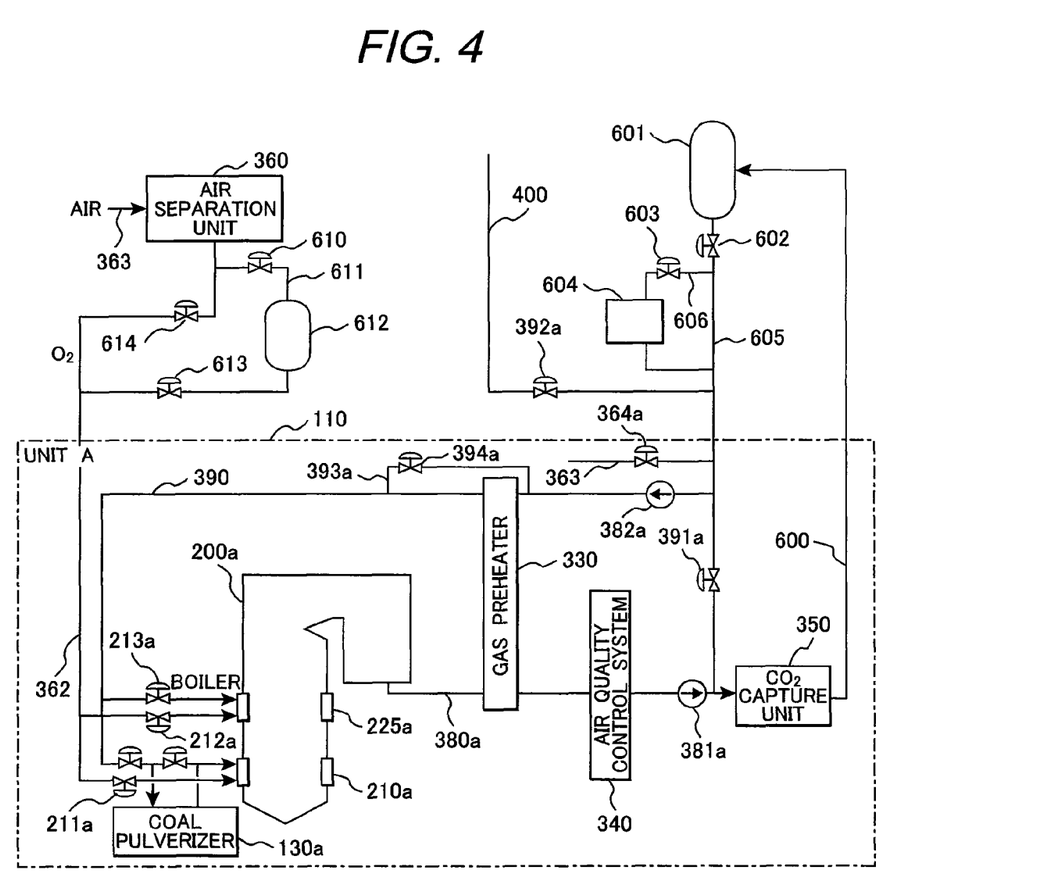
FIG. 4 is a drawing for showing the constitution of the boiler plant relating to an Embodiment 2 of the present invention.

This embodiment as shown in FIG. 4, when starting the first unit A among two units (unit A and unit B), indicates a method for reducing the carbon dioxide quantity discharged from the first unit A. FIG. 4 shows the constitution of the unit A.

The differences from the unit constitution of the embodiment shown in FIG. 1 are the oxygen gas supply method and the supply method of exhaust gas mainly including carbon dioxide. In the present embodiment, the flow path through which oxygen gas flows from the air separation unit 360 to the burner 210a and the gas port 225a is branched halfway and includes an oxygen storage line 611. On the oxygen storage line 611, an oxygen storage tank 612 is installed and the oxygen storage tank 612 stores oxygen gas. Therefore, the oxygen storage tank 612 can also supply oxygen gas.

The oxygen quantity stored in the oxygen storage tank 612 is controlled by an oxygen storage quantity regulating valve 610 on the upstream side and the oxygen quantity supplied from the oxygen storage tank 612 is controlled by a stored oxygen supply quantity regulating valve 613 on the downstream side.

On the other hand, the carbon dioxide captured by the carbon dioxide capture unit 350 is stored in a carbon dioxide tank 601. And, the carbon dioxide 601 can supply carbon dioxide to the burner 210a and the gas port 225a. A stored carbon dioxide supply quantity regulating valve 602 installed on the downstream side of the carbon dioxide tank 601 controls the carbon dioxide quantity supplied from the carbon dioxide tank 601.

Further, a part of the carbon dioxide supplied from the carbon dioxide tank 601 is structured so as to rise in temperature by a heater 604. The carbon dioxide quantity flowing through the heater 604 is controlled by the aperture of a flow rate regulating valve 603. The carbon dioxide raised in temperature by the heater 604 joins a stored carbon oxide supply pipe 605. Although not drawn, the aperture of the flow rate regulating valve 603 is controlled so that the temperature of the carbon dioxide measured after the joint coincides with the target value of the temperature, thus the temperature of the carbon dioxide can be controlled. As mentioned above, the heater 604 is installed, thus the temperature of the carbon dioxide injected from the burner 210a is raised and fuel can be stably burned. Further, the heat absorption quantity of the boiler can be improved.

By use of such a constitution, even when the first unit A 100a is started, oxygen can be supplied from the oxygen storage tank 612 and carbon dioxide can be supplied from the carbon dioxide tank 601. Therefore, the unit A 100a can be started by the oxyfuel combustion system and the carbon dioxide discharge quantity can be reduced.

Further, oxygen stored in the oxygen storage tank 612 and carbon dioxide stored in the carbon dioxide tank 601 are stored during the ordinary operation of the units.

Further, the oxygen stored in the oxygen storage tank 612 can be used during the ordinary operation of the units. Particularly, a thermal power plant is often required to be operated according to load control, so it should be able to follow a sudden load change. Also, the air separation unit 360 has its limit set to the change speed of the oxygen quantity supplied, so a load change operation exceeding it is difficult. Therefore, if the boiler is operated, when the load increases, that is, when the oxygen demand quantity increases, the oxygen stored in the oxygen storage tank 612 is discharged, while when the load decreases, that is, when the oxygen demand quantity decreases, surplus oxygen is stored in the oxygen storage tank 612, and it can respond to a sudden load change. Therefore, flexible operation according to the conditions can be performed.

What is claimed is:

1. An oxyfuel combustion boiler plant having a first boiler and a second boiler for injecting gas including oxygen in higher concentration than that in the air, gas including carbon dioxide in higher concentration than that in the air, and fuel from a burner and generating steam by combustion gas in a furnace, a first CO2 capture unit for capturing carbon dioxide in an exhaust gas discharged from the first boiler, and a second CO2 capture unit for capturing carbon dioxide in the exhaust gas discharged from the second boiler, respectively, the oxyfuel combustion boiler plant further comprising:
   an exhaust gas supply pipe for supplying exhaust gas discharged from the first boiler to a burner of the second boiler,
   an exhaust gas circulation system for recirculating exhaust gas discharged from the second boiler to the burner of the second boiler,
   a gas flow rate control apparatus for controlling an exhaust gas flow rate flowing into the second boiler, including supply of the exhaust gas of the first boiler to the second boiler when starting the second boiler and after arrival at a predetermined load condition of the second boiler, reducing an exhaust gas quantity of the first boiler and increasing a circulation exhaust gas quantity of the second boiler, and
   a switching unit controlled by the gas flow rate control apparatus to permit the second boiler to use the exhaust gas of the first boiler supplied from the exhaust gas supply pipe when starting the second boiler and after arrival the predetermined load condition of the boiler, to reduce the exhaust gas quantity of the first boiler and increase the circulation exhaust gas quantity of the second boiler.

2. An oxyfuel combustion boiler plant having a first boiler and a second boiler for injecting gas including oxygen in higher concentration than that in the air, gas including carbon dioxide in higher concentration than that in the air, and fuel from a burner and generating steam by combustion gas in a furnace, a first CO2 capture unit for capturing carbon dioxide in an exhaust gas discharged from the first boiler, and a second CO2 capture unit for capturing carbon dioxide in the exhaust gas discharged from the second boiler respectively, the oxyfuel combustion boiler plant further comprising:
   an air quality control system for removing harmful components from exhaust gas discharged from the first boiler,
   an exhaust gas supply pipe for supplying exhaust gas discharged from the air quality control system to a burner of the second boiler,
   an exhaust gas circulation system for recirculating exhaust gas discharged from the second boiler to the burner of the second boiler,
   a gas flow rate control apparatus for controlling an exhaust gas flow rate flowing into the second boiler, a gas flow rate control apparatus for controlling an exhaust gas flow rate flowing into the second boiler, including supply of the exhaust gas of the first boiler to the second boiler when starting the second boiler and after arrival at a predetermined load condition of the second boiler, reducing an exhaust gas quantity of the first boiler and increasing a circulation exhaust gas quantity of the second boiler, and
   a switching unit controlled by the gas flow rate control apparatus to permit the second boiler to use the exhaust gas of the first boiler supplied from the exhaust gas supply pipe when starting the second boiler and after arrival the predetermined load condition of the boiler, to reduce the exhaust gas quantity of the first boiler and increase the circulation exhaust gas quantity of the second boiler.

3. The oxyfuel combustion boiler plant according to claim 2, wherein:
   the gas flow rate control apparatus calculates a total exhaust gas quantity obtained by adding an exhaust gas quantity necessary for the operation condition of the second boiler to an exhaust gas quantity necessary for the load demand of the first boiler and controls an exhaust gas flow rate flowing into the second boiler on the basis of the total exhaust gas quantity.

4. The oxyfuel combustion boiler plant according to claim 2, wherein:

the gas flow rate control apparatus calculates a total exhaust gas quantity obtained by adding an exhaust gas quantity necessary for the operation condition of the second boiler to an exhaust gas quantity necessary for the load demand of the first boiler and controls an exhaust gas flow rate flowing into the second boiler on the basis of the oxygen concentration in the mixed gas of the oxygen and exhaust gas injected from the burner of the second boiler.

5. An operating method of an oxyfuel combustion boiler plant having a first boiler and a second boiler for injecting gas including oxygen in higher concentration than that in the air, gas including carbon dioxide in higher concentration than that in the air, and fuel from a burner and generating steam by combustion gas in a furnace, a first CO2 capture unit for capturing carbon dioxide in an exhaust gas discharged from the first boiler, and a second CO2 capture unit for capturing carbon dioxide in the exhaust gas discharged from the second boiler, respectively, the oxyfuel combustion boiler plant further comprising:

an exhaust gas supply pipe for supplying exhaust gas discharged from the first boiler to a burner of the second boiler, an exhaust gas circulation system for recirculating exhaust gas discharged from the second boiler to the burner of the second boiler, and a gas flow rate control apparatus for controlling an exhaust gas flow rate flowing into the second boiler, wherein:

when starting the second boiler, the exhaust gas of the first boiler supplied from the exhaust gas supply pipe is used, and after arrival at a predetermined load condition of the boiler, an exhaust gas quantity of the first boiler is reduced, and a circulation exhaust gas quantity of the second boiler is increased.

* * * * *